US012621390B2

(12) United States Patent
Akiyama et al.

(10) Patent No.: US 12,621,390 B2
(45) Date of Patent: May 5, 2026

(54) INFORMATION PROCESSING TERMINAL

(71) Applicant: MAXELL, LTD., Kyoto (JP)

(72) Inventors: Hitoshi Akiyama, Kyoto (JP);
Kazuhiko Yoshizawa, Kyoto (JP)

(73) Assignee: MAXELL, LTD., Kyoto (JP)

( * ) Notice: Subject to any disclaimer, the term of this patent is extended or adjusted under 35 U.S.C. 154(b) by 636 days.

(21) Appl. No.: 17/918,951

(22) PCT Filed: Apr. 14, 2020

(86) PCT No.: PCT/JP2020/016457
§ 371 (c)(1),
(2) Date: Oct. 14, 2022

(87) PCT Pub. No.: WO2021/210074
PCT Pub. Date: Oct. 21, 2021

(65) Prior Publication Data
US 2023/0239411 A1    Jul. 27, 2023

(51) Int. Cl.
H04M 15/00    (2024.01)
(52) U.S. Cl.
CPC .......... H04M 15/62 (2013.01); H04M 15/60 (2013.01); H04M 15/67 (2013.01); H04M 15/8351 (2013.01)
(58) Field of Classification Search
CPC ...... H04M 15/62; H04M 15/60; H04M 15/67; H04M 15/8351; G06Q 50/60; H04W 4/24
See application file for complete search history.

(56) References Cited

U.S. PATENT DOCUMENTS

| 2016/0142559 A1* | 5/2016 | Pollak | ................ | H04M 15/853 |
| | | | | 455/406 |
| 2016/0143040 A1* | 5/2016 | Rivard | ................ | H04W 24/08 |
| | | | | 370/329 |
| 2017/0187888 A1 | 6/2017 | Shukla | | |

FOREIGN PATENT DOCUMENTS

| JP | 2016-040673 A | | 3/2016 |
| JP | 2016-052070 A | | 4/2016 |
| JP | 2016052069 A | * | 4/2016 |
| JP | 2019-012969 A | | 1/2019 |
| WO | 2008/053565 A1 | | 5/2008 |

OTHER PUBLICATIONS

International Search Report of PCT/JP2020/016457 dated Sep. 1, 2020.

* cited by examiner

*Primary Examiner* — Christopher M Brandt
(74) *Attorney, Agent, or Firm* — MATTINGLY & MALUR, PC

(57)    ABSTRACT

An information processing terminal allowing a user to view a content stored in an external server via contracted communication lines comprises a communication data amount management unit configured to manage an amount of data communicated via a high-speed communication line of the communication lines, and a display control unit configured to execute display control, and in a case where there is a possibility that an amount of data necessary for viewing of the content is about to exceed an amount of data remaining within a contracted amount of data, the communication data amount management unit calculates, as a purchase price, a price to additionally purchase a predetermined amount of data of the high-speed communication line based on a predetermined condition, and the display control unit displays the calculated purchase price.

12 Claims, 11 Drawing Sheets

FIG. 4A
100
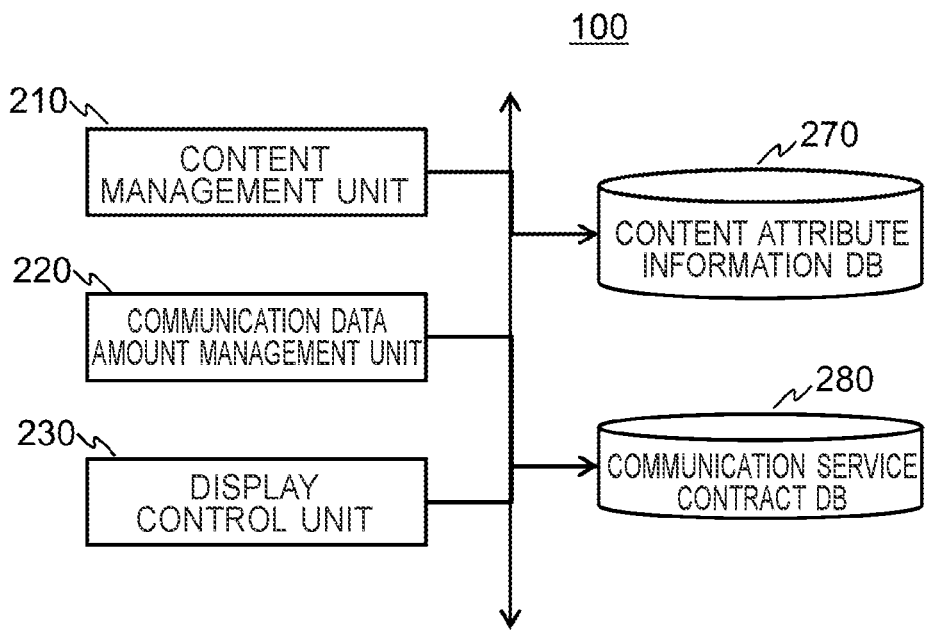
FIG. 4B
271
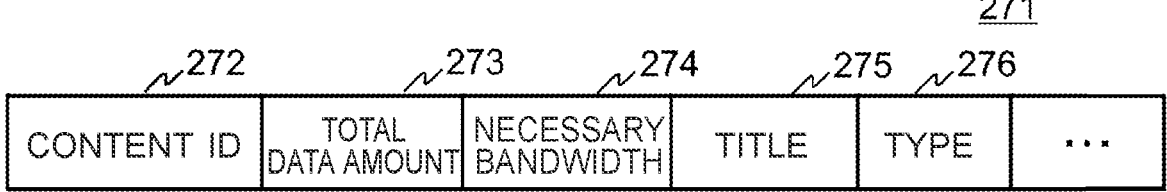
FIG. 4C
281
| TERMINAL ID | CONTRACT DATA AMOUNT | LOW-SPEED BANDWIDTH | ADDITIONAL PURCHASE PRICE (PER UNIT DATA AMOUNT) | ... |
|---|---|---|---|---|
| 282 | 283 | 284 | 285 | |

FIG. 8

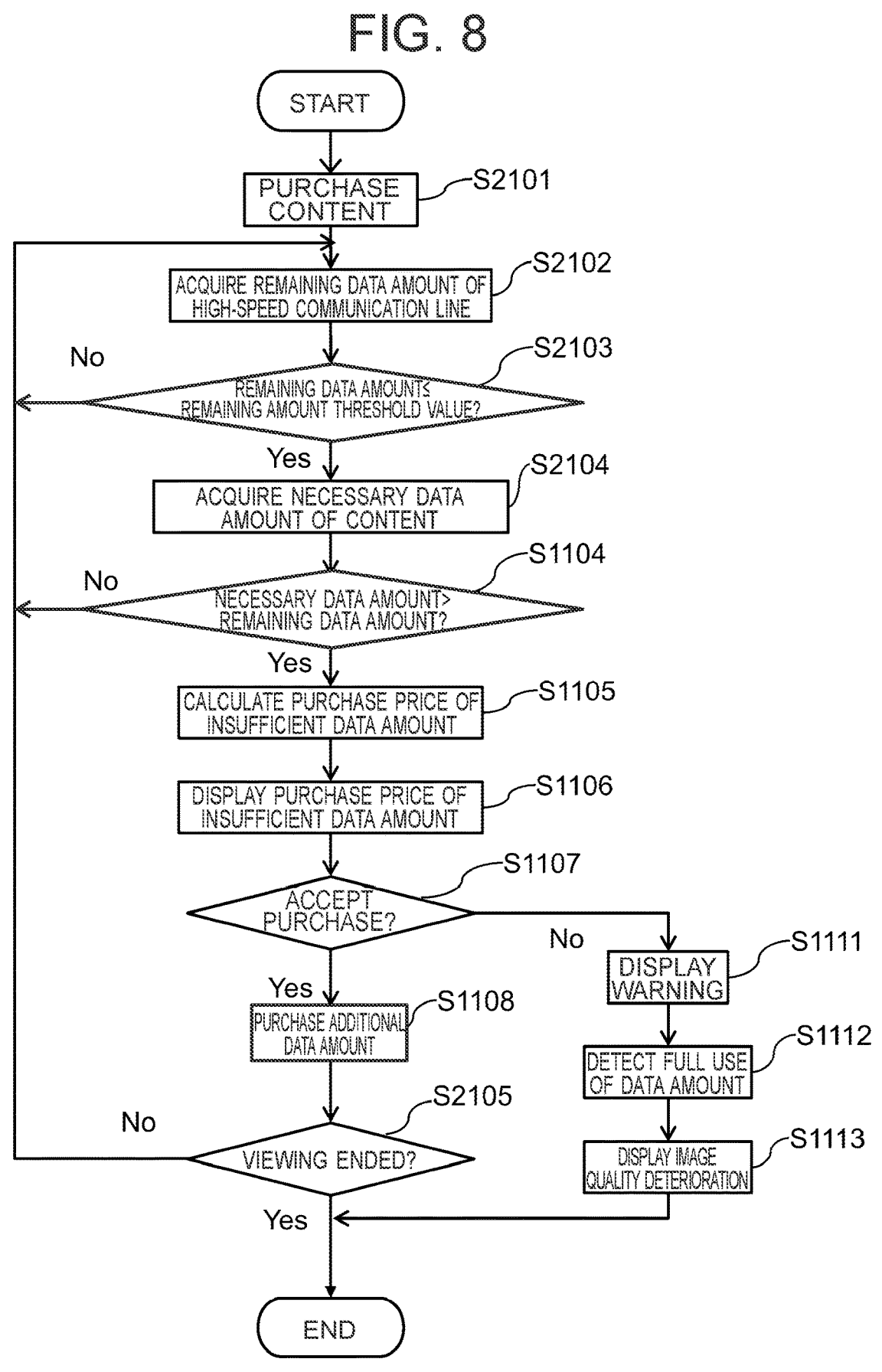

START

PURCHASE CONTENT — S2101

ACQUIRE REMAINING DATA AMOUNT OF HIGH-SPEED COMMUNICATION LINE — S2102

S2103 — REMAINING DATA AMOUNT≤ REMAINING AMOUNT THRESHOLD VALUE? → No

Yes

ACQUIRE NECESSARY DATA AMOUNT OF CONTENT — S2104

S1104 — NECESSARY DATA AMOUNT> REMAINING DATA AMOUNT? → No

Yes

CALCULATE PURCHASE PRICE OF INSUFFICIENT DATA AMOUNT — S1105

DISPLAY PURCHASE PRICE OF INSUFFICIENT DATA AMOUNT — S1106

ACCEPT PURCHASE? — S1107

No → DISPLAY WARNING — S1111

DETECT FULL USE OF DATA AMOUNT — S1112

DISPLAY IMAGE QUALITY DETERIORATION — S1113

Yes

PURCHASE ADDITIONAL DATA AMOUNT — S1108

VIEWING ENDED? — S2105

No

Yes

END

INFORMATION PROCESSING TERMINAL

TECHNICAL FIELD

The present invention relates to a technique for management of data traffic. In particular, the present invention relates to a technique for management of data traffic while a user is viewing content.

BACKGROUND ART

A user of a mobile communication terminal such as a smartphone may make a contract of a communication service having a limitation in an amount of data available across a high-speed communication line with a communication carrier by a contract unit period (for example, monthly), and use the provided communication service. In such a contract of the communication service, when the data usage reaches the limit amount, the user has to use the smartphone with a low-speed communication line until next contract unit period.

While the user is viewing the high-quality content, if the data usage reaches the limit amount, the communication line is switched to the low-speed communication line and thus the user cannot continue to view the content being viewed or has to view the content with low-quality. At this point, in order to purchase an additional amount of data of the high-speed communication line, the user has to apply for additional purchase to the carrier. It is usually the case that the content is not provided by the carrier but by a content provider, and thus the user is forced to switch to an application or web page of the carrier. This reduces the convenience of the user.

There has been known a data traffic management device capable of eliminating a shortage of an available amount of data and an insufficient balance without requiring a user to perform a conscious operation in data communication with a wireless communication line having a limitation in the amount of data. For example, Patent Literature 1 teaches "in a data traffic management device for managing the data traffic of wireless connection with the data traffic being limited, an additional purchase processing unit performs processing for the additional purchase of data traffic with expiration date. A residual data traffic management unit manages the residual of data traffic including additional purchase data traffic, which is data traffic with expiration date additionally purchased. A purchase contents identifying unit identifies the additional purchase data traffic. A purchase condition determination unit determines whether a condition for purchasing additional purchase data traffic is satisfied or not. If the purchase condition determination unit determines that the condition for purchasing additional purchase data traffic is satisfied, the additional purchase processing unit performs the purchase processing of the additional purchase data traffic (excerpted from Abstract)".

CITATION LIST

Patent Literature

Patent Literature 1: JP-A-2016-40673

SUMMARY OF INVENTION

Technical Problem

However, the technique according to Patent Literature 1 only considers the residual amount of data included in the contracted communication service. That is, Patent Literature 1 does not consider the amount of data of the content and the playing condition of the content. For example, even when most of the content has been played and the data necessary for playing the remaining of the content is small, if the residual amount of the contracted data amount satisfies a predetermined purchase condition, the additional data would be purchased. This may place an unnecessary burden on the user.

The present invention has been made in view of the circumstances above, and an object of the present invention is to provide a technique allowing a user to continuously view high-quality content for a desired period of time without placing an unnecessary burden on the user.

Solution to Problem

The present invention provides an information processing terminal allowing a user to view a content stored in an external server via contracted communication lines, the information processing terminal comprising: a communication data amount management unit configured to manage an amount of data communicated via a high-speed communication line of the communication lines; and a display control unit configured to execute display control, in a case where there is a possibility that an amount of data necessary for viewing of the content is about to exceed a remaining data amount which is an amount of data remaining within a contracted amount of data, the communication data amount management unit acquires necessary information which is information necessary for additional purchase of a predetermined amount of data of the high-speed communication line based on a predetermined condition, and the display control unit displays the necessary information.

Advantageous Effects of Invention

According to the present invention, it is possible to provide a technique allowing a user to continuously view high-quality content for a desired period of time without placing an unnecessary burden on the user. The problems, configurations, and advantageous effects other than those described above will be clarified by explanation of the embodiments below.

BRIEF DESCRIPTION OF DRAWINGS

FIG. 4(a) is a functional block diagram of the information display terminal according to the first embodiment, FIG. 4(b) is a diagram for explaining an example of a content attribute information database according to the first embodiment, and FIG. 4(c) is a diagram for explaining an example of a communication service contract database according to the first embodiment.

FIG. 8 illustrates a flowchart of communication data amount management processing according to a second embodiment.

DESCRIPTION OF EMBODIMENTS

Figure 1:
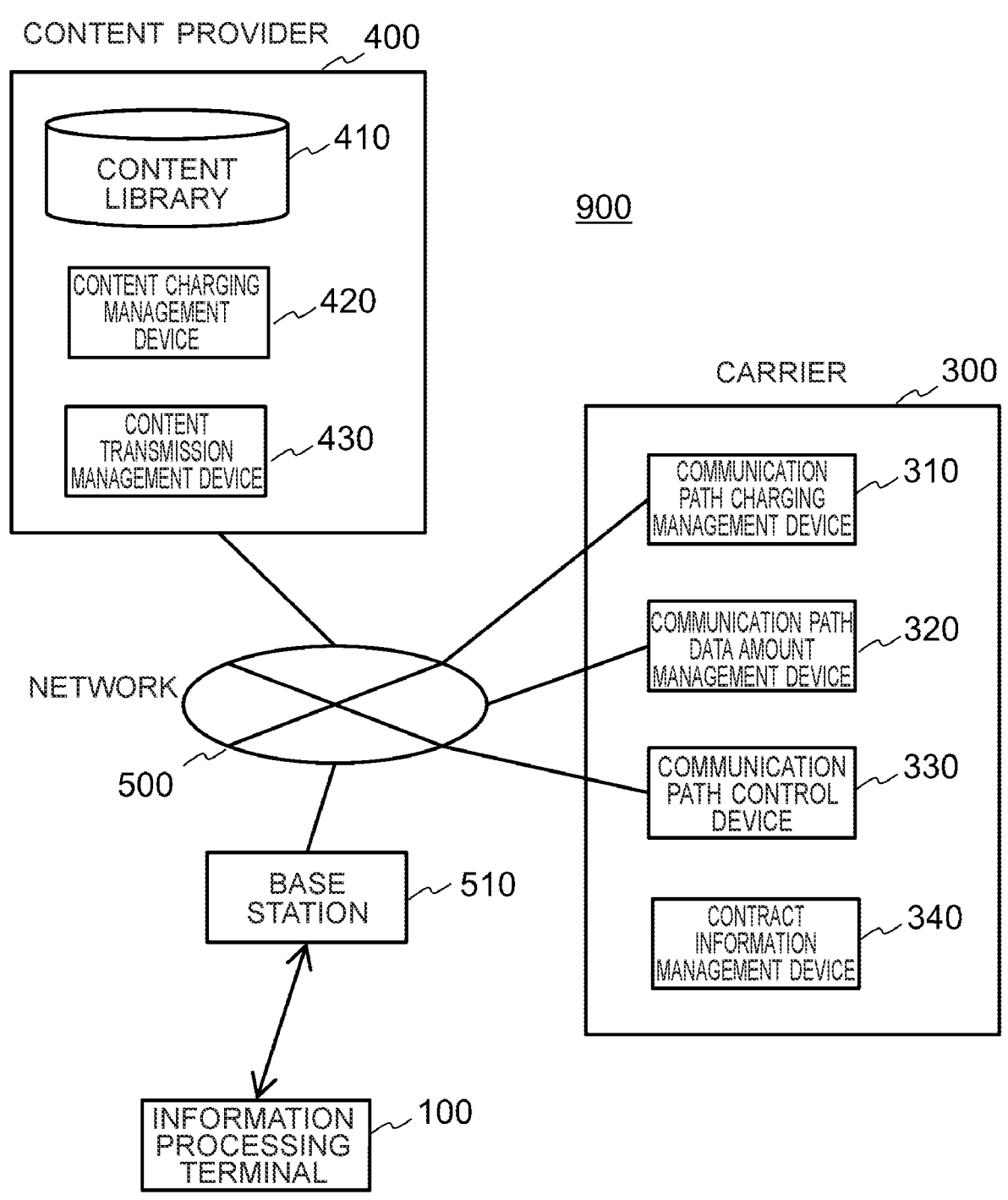
FIG. 1 is a diagram for explaining an outline of a communication system according to a first embodiment.

Hereinafter, embodiments of the present invention will be described with reference to the drawings. Note that the same reference signs used in the drawings indicate the same functions and processes.

First Embodiment

In the present embodiment, it is determined, depending on an amount of data necessary for viewing the content to be viewed, whether an amount of data transmittable through a contracted high-speed communication line is insufficient in terms of limitations in the communication line. If the amount of data is insufficient, an additional amount of data is purchased. Hereinafter, an amount of data transmitted (communicated) via a high-speed communication line is simply referred to as a data amount of a high-speed communication line.

For example, a user of an information processing terminal makes a contract of a monthly communication service having a limitation in a data amount of a high-speed communication line with a communication carrier (carrier) who offers communication services, and uses the contracted communication service. In the present embodiment, the total amount of data of high-quality content provided by a provider who offers content (hereinafter, referred to as "content provider") is compared with the remaining amount of data (remaining data amount) of the high-speed communication line contracted at that time. When the remaining data amount of the high-speed communication line is less than the data amount necessary for viewing of the content, an insufficient data amount of the high-speed communication line, which is a difference between the both, and information necessary for obtaining the insufficient data amount, for example, a purchase price, is calculated, and the calculated necessary information is presented. Hereinafter, in the present embodiment, an example of calculating a purchase price as necessary information will be described.

Firstly, an outline of an overall configuration of a communication system according to the present embodiment will be described. FIG. 1 is a diagram for explaining an outline of a communication system 900 according to the present embodiment.

The communication system 900 according to the present embodiment includes an information processing terminal 100, a carrier-side device 300, a content server 400, and a base station 510. The base station 510, the carrier-side device 300, and the content server 400 are connected to a network 500 and thus can transmit and receive data to and from each other via the network 500. Here, in FIG. 1, each number of information processing terminal 100, carrier-side device 300, content server 400, and base station 510 is one, however, the number thereof is not limited thereto.

The carrier-side device 300 is an information processing device managed by a carrier. As a configuration for the processing of the present embodiment, for example, the carrier-side device 300 includes a communication path charging management device 310, a communication path data amount management device 320, a communication path control device 330, and a contract information management device 340.

The contract information management device 340 is configured to manage information on users who subscribe to communication services. The information to be managed includes, for example, information identifying users (user ID), identification information of communication lines (communication line number), details of the contracts, and the like.

The communication path control device 330 is configured to control a communication path. The data transmitted from the information processing terminal 100 to the base station 510 is transferred from the base station 510 to the communication path control device 330 of the carrier-side device 300. If the received data is within the scope of the contract, the communication path control device 330 outputs the data at predetermined speed (via a high-speed communication line) to the network 500. Furthermore, if the data input from the network 500 is within the scope of the contract, the communication path control device 330 transfers the data via the high-speed communication line to the information processing terminal 100 via the base station 510. If the data input from the network 500 exceeds the scope of the contract, the communication path control device 330 reduces the communication speed and then transfers the data.

The communication path data amount management device 320 is configured to manage the remaining data amount of the capacity of the high-speed communication line for each user. The communication path data amount management device 320 acquires an amount of transferred data transferred by the communication path control device 330, and refers to the contract information management device 340 to manage the remaining data amount for each user.

The communication path charging management device 310 is configured to manage the charges for each user. The communication path charging management device 310 refers to the contract information management device 340 based on the information from the communication path data amount management device 320 and the communication path control device 330 to realize the management for each user.

The content server 400 is a server managed by a content provider, and is configured to manage content to be provided to users. The content server 400 according to the present embodiment includes a content library 410, a content charging management device 420, and a content transmission management device 430.

The content library 410 is configured to retain content that can be provided. The content library 410 manages each content in association with corresponding attribute data. The attribute data includes, for example, a total amount of data, a charge for viewing, and the like. The content charging management device 420 is configured to manage charges for each user. The content transmission management device 430 is configured to provide users with the managed content in response to requests from the users.

Upon receiving a purchase request from the information processing terminal 100 which will be described later, the content server 400 transmits content attribute information 271 stored in the content library 410 in association with the content identified by the purchase request to the information processing terminal 100 which made the request. The content attribute information 271 includes the total amount of data of the content. Thereafter, the content server 400 starts transmission of the content.

The network 500 is, for example, a wide area network (WAN), the Internet, or the like.

[Hardware Configuration of Information Processing Terminal]

In the following, a hardware configuration of the information processing terminal 100 according to the present embodiment will be described. The information processing terminal 100 of the present embodiment is an information processing device allowing a user to view content provided by a content provider via a communication line provided by a carrier. The information processing terminal 100 is, for example, a smart phone, a personal computer (PC), a tablet, or a head mounted display (HMD).

Figure 2:
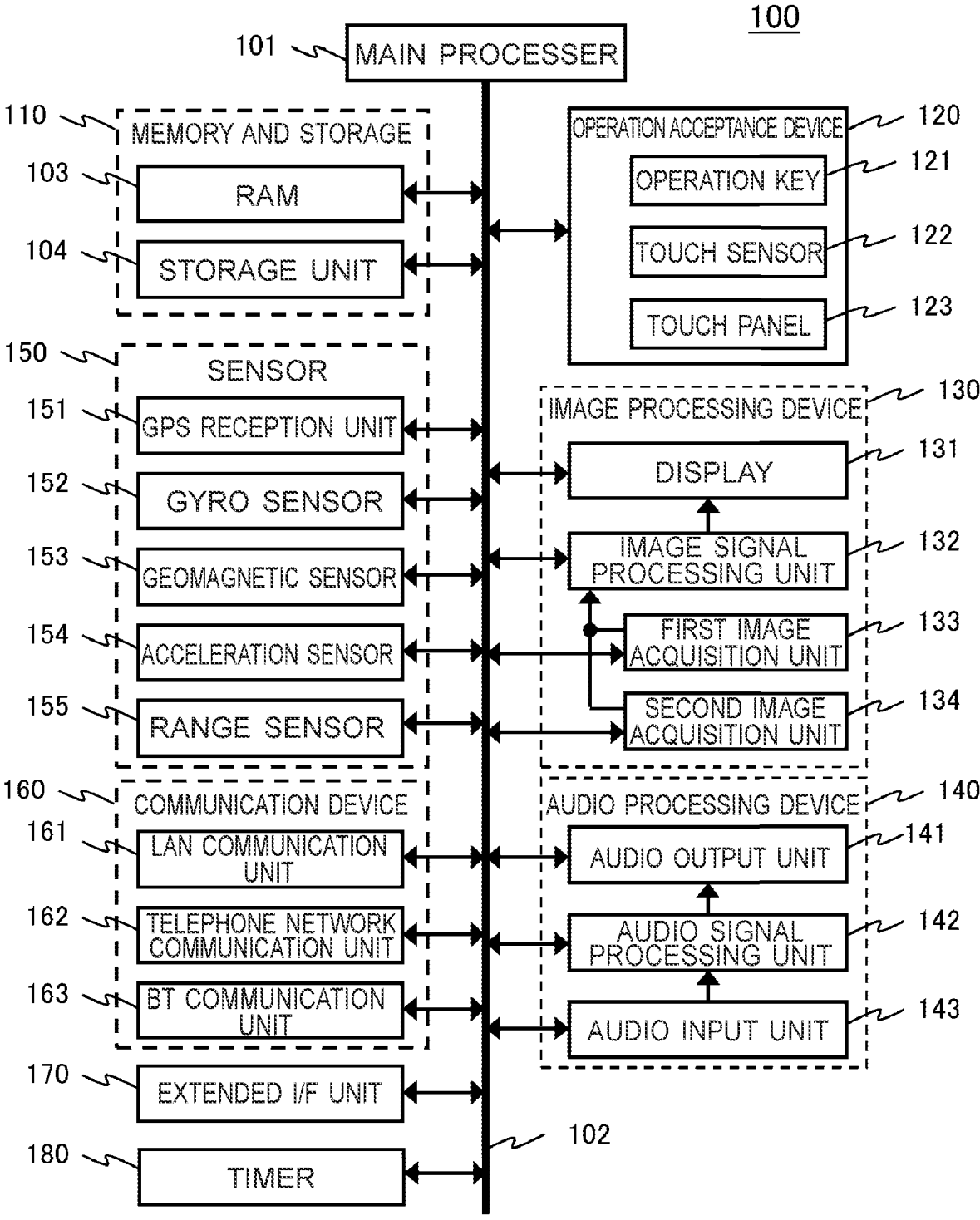
FIG. 2 is a hardware configuration diagram of an information display terminal according to the first embodiment.

FIG. 2 is a hardware configuration diagram of the information display terminal 100 according to the present embodiment. As illustrated in FIG. 2, the information display terminal 100 of the present embodiment includes a main processor 101, a system bus 102, a memory and storage 110, an operation acceptance device 120, an image processing device 130, an audio processing device 140, a sensor 150, a communication device 160, an extended interface (I/F) unit 170, and a timer 180.

The main processor 101 is a main control unit configured to control the entire of the information display terminal 100 in accordance with a predetermined program. The main processor 101 is implemented using a central processor unit (CPU) or a microprocessor unit (MPU). The main processor 101 executes the processing in accordance with a clock signal measured and output by the timer 180.

The system bus 102 is a data communication path through which data is transmitted and received between the main controller 101 and each part of the information display terminal 100.

The memory and storage 110 include a RAM 103 and a storage 104.

The RAM 103 is a program area during execution of a basic operation program or other application programs. Furthermore, the RAM 103 serves as a temporary storage area for temporarily holding data as necessary during execution of various application programs. The RAM 103 may be integrated with the main controller 101.

The storage 104 is configured to retain, for example, various operation setting values of the information display terminal 100, and information about a user of the information display terminal 100. In addition, the storage 104 may hold, for example, still image data and moving image data captured by the information display terminal 100. Here, the information display terminal 100 shall be able to extend its functions by downloading new application programs from application servers via the Internet. At this time, the downloaded new application programs are stored in the storage 104. The main controller 101 loads the new application programs stored in the storage 104 onto the RAM 103 and executes it, whereby the information display terminal 100 can obtain the various functions.

The storage 104 needs to hold stored information even while the information display terminal 100 is not being supplied with power. Accordingly, as the storage 104, a device such as a flash ROM, a solid-state drive (SSD), or a hard disc drive (HDD) is used.

The operation acceptance device 120 is configured to accept an operation instruction input to the information display terminal 100. In the first embodiment, the operation acceptance device 120 includes an operation key 121 having such as a power key, a volume key, and a home key. In the case where the information display terminal 100 is a HMD, the operation acceptance device 120 includes a touch sensor 122 for accepting an operation instruction through a touch pad. In the case where the information display terminal 100 is the smartphone 100S which will be described later, the operation acceptance device 120 includes a touch panel 123 placed so as to be superimposed on a display 131. Note that the information display terminal 100 according to the present embodiment does not necessarily have to include all the functions of the operation acceptance device 120.

In the case of the smartphone 100S, it may be configured to accept an input of an instruction through such as a keyboard connected to the extended interface unit 170, which will be described later. Furthermore, the information display terminal 100 may accept operations through a separate information processing device connected thereto by wired communication or wireless communication.

The image processing unit 130 is an image (video) processor, and includes the display 131, an image signal processing unit 132, a first image acquisition unit 133, and a second image acquisition unit 134.

The display 131 is, for example, a display device (display) such as a liquid crystal panel, and configured to present the image data processed by the image signal processing unit 132, which will be described later, to the user of the information display terminal 100. In the case where the information display terminal 100 is a HMD, the display 131 may be a transparent type display.

The image signal processing unit 132 is an image (video) signal processor configured to process images received from the first image acquisition unit 133 and the second image acquisition unit 134. The image signal processing unit 132 is further configured to superimpose an object created by the main processer 101 and the like on the input image, and output it to the display 131.

The first image acquisition unit 133 is configured to acquire images around the information display terminal 100. In the case of the information processing terminal 100 is a HMD, the first image acquisition unit 133 is an external camera. In the case of the smartphone 100S, the first image acquisition unit 133 is a rear camera (out-camera).

The second image acquisition unit 134 is configured to acquire images of an area different from an image acquisition area of the first image acquisition unit 133. For example, the second image acquisition unit 134 acquires images of the eye of the user. In the case of the information processing terminal 100 is a HMD, the second image acquisition unit 134 is an internal camera (camera for detecting a line-of-sight), and in the case of the smartphone 100S, the second image acquisition unit 134 is a front camera (in-camera). Note that in the case of the information processing terminal 100 is a HMD, the second image acquisition unit 134 functions, together with a line-of-sight identification unit which will be described later, as a line-of-sight detection sensor.

The audio processing device 140 is an audio processor configured to process audio data, and includes an audio output unit 141, an audio signal processing unit 142, and an audio input unit 143. The audio output unit 141 is a speaker, and is configured to output the audio signal processed by the audio signal processing unit 142 to the outside. The audio signal processing unit 142 is an audio signal processor. The audio input unit 143 is a microphone, and is configured to convert a voice of the user into voice data and input the converted voice data.

The sensor 150 includes a group of sensors configured to detect a state of the information display terminal 100. In the first embodiment, the sensor 150 includes a Global Positioning System (GPS) reception unit 151, a gyro sensor 152, a geomagnetic sensor 153, an acceleration sensor 154, and a range sensor 155. The sensor group including the sensors above enables detection of a position, movement, inclination, direction, and the like of the information display terminal 100. The range sensor 155 is a depth sensor, and is configured to acquire distance information from the information display terminal 100 to an object. The sensor 150 may further include other sensors.

The communication device 160 is a communication processor configured to execute communication processing, and includes a local area network (LAN) communication unit 161, a telephone network communication unit 162, and a Bluetooth (registered mark, BT) communication unit 163. The LAN communication unit 161 is connected to a wireless communication access point of the Internet by wireless communication, thereby enabling transmission and reception of data. The telephone network communication unit 162 is connected to a base station of the mobile telephone communication network by wireless communication, thereby enabling telephone communication (telephone call) and transmission and reception of data. The BT communication unit 163 is an interface used to communicate with an external device in accordance with the Bluetooth standard. The LAN communication unit 161, the telephone network communication unit 162, and the BT communication unit 163 include an encoding circuit, a decoding circuit, an antenna, and the like, respectively. The communication device 160 may further include, for example, an infrared communication unit.

The extended interface unit 170 includes a group of interfaces used to extend the functions of the information display terminal 100. In the first embodiment, the extended interface unit 170 includes, for example, a charging terminal, an audio-and-video interface, a universal serial bus (USB) interface, and a memory interface. The audio-and-video interface is configured to receive a video signal, an audio signal, or both from an external audio-and-video output device, and output a video signal, an audio signal, or both to the external audio-and-video input device. The USB interface is used to connect a keyboard or other USB devices to the information display terminal 100. The memory interface is used to connect a memory card and other memory media to the information display terminal 100 to enable transmission and reception of data.

The configuration example of the information processing terminal 100 illustrated in FIG. 2 includes a large number of elements that are not essential to the present embodiment. Note that even the configuration not including these elements does not impair the advantageous effects of the present embodiment.

<External View>

Figures 3A, 3B:
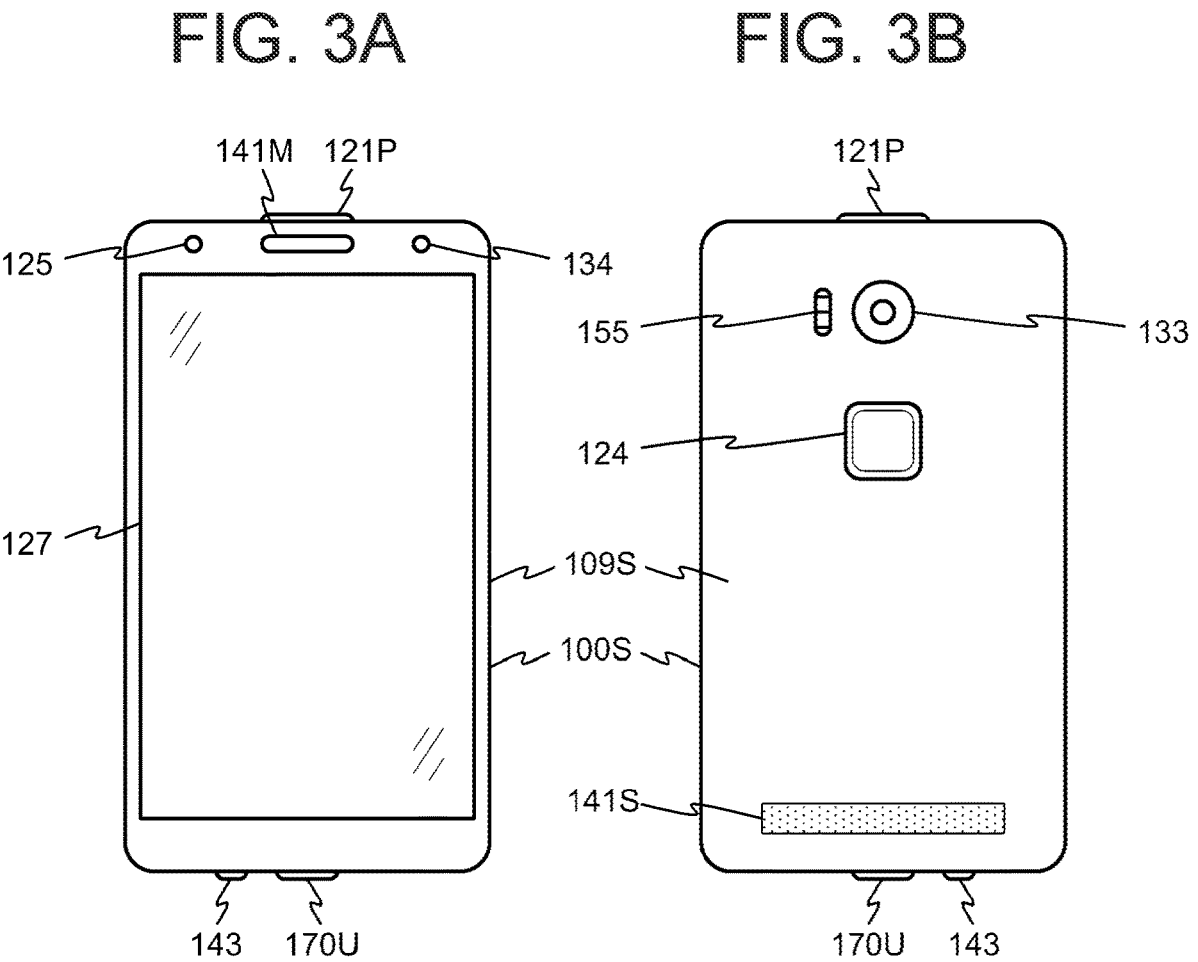
FIG. 3(a) and FIG. 3(b) illustrate appearance of the information display terminal according to the first embodiment.

In the following, an appearance of the information display terminal 100 in the case where it is a smartphone will be described. FIG. 3(*a*) is a front view of the information display terminal 100, and FIG. 3(*b*) is a rear view thereof. In the following, an arrangement of each part described in the hardware configuration will be explained.

The information display terminal 100 includes a case 109S in which each part of the information display terminal 100 is housed. Note that, in the following, the vertical direction and lateral direction are as illustrated.

The case 109S is provided with the display 131 at the center of the front face. In the case of the smartphone 100S, it includes a touch screen 127 serving both as the display 131 and the touch panel 123.

The case 109S is provided with the first image acquisition unit 133 (a rear camera, an out-camera, or both) on the rear face, and the second image acquisition unit 134 (a front camera, an in-camera, or both) on the front face. The second image acquisition unit 134 is placed above the front display 131.

The case 109S is provided with the audio output unit 141, for example, at the upper central portion of the display 131 on the front face and at the lower portion on the rear face, respectively. An audio output unit 141M placed on the upper portion of the front face of the case 109S is a mono speaker, and is used for voice calls. An audio output unit 141S placed at the lower portion of the rear face of the case 109S is a stereo speaker, and is used for playing moving images or the like. Furthermore, the audio input unit 143 is provided, for example, on the lower face of the case 109S.

The distance sensor 155 is placed on the rear face of the case 109S, for example, next to the first image acquisition unit 133.

As the operation key 121, for example, a power switch 121P is placed on the upper face of the case 109S. As the extended interface unit 170, a USB terminal 170U is placed on the lower face of the case 109S. In addition, the case 109S may be provided with a fingerprint sensor 124 to be placed on the rear face, an LED 125 to be placed above the display 131 on the front face and the like.

[Functional Configuration of Information Processing Terminal]

Next, a functional configuration of the information processing terminal 100 according to the present embodiment will be described. Here, only the configuration related to the present embodiment will be extracted and described.

As illustrated in FIG. 4(*a*), the information processing terminal 100 of the present embodiment includes a content management unit 210, a communication data amount management unit 220, and a display control unit 230. Furthermore, the information processing terminal 100 includes a content attribute information database (DB) 270 and a communication service contract database (DB) 280.

The content attribute information database 270 retains the content attribute information 271 associated with each content to be viewed by a user. The content attribute information 271 is transmitted from the content server 400 prior to transmission of the content. As illustrated in FIG. 4(*b*), the content attribute information 271 includes, for example, a content ID 272 that is information identifying the content, a total data amount 273 indicating the total amount of data of the content, and a necessary transmission speed (necessary bandwidth) 274 of the content. In addition, the content attribute information 271 may include a title 275 of the content, a type 276 (moving image, still image) of the content, and the like.

The content management unit 210 is configured to manage content. For example, the content management unit 210 manages purchase and play of the content. Upon purchasing the content, the content management unit 210 transmits a purchase request, which is a request for purchasing the content, to the content provider in accordance with an instruction from the user. In response to the purchase request, the content management unit 210 acquires the total amount of data of the content from the content attribute information 271 which is received prior to reception of the content. Then, the content management unit 210 notifies the communication data amount management unit 220 of the total amount of data as the necessary data amount.

The communication data amount management unit 220 is configured to manage the amount of data communicated via the high-speed communication line of the communication lines contracted with the carrier. In the present embodiment, the communication data amount management unit 220 manages the remaining data amount at present. Furthermore, upon acquiring the necessary data amount from the content management unit 210, the communication data amount management unit 220 compares the acquired necessary data amount with the remaining data amount. When the remaining data amount is less than the necessary data amount and thus the remaining data amount is insufficient, the communication data amount management unit 220 calculates a purchase price of the insufficient amount.

In the present embodiment, the communication data amount management unit 220 manages communication line contract information 281 about the communication lines that the user contracts with the carrier. In the communication service contract database 280, the communication line contract information 281 about the communication line that the user contracts with the carrier is managed. As illustrated in FIG. 4(*c*), the communication line contract information 281 to be managed includes, for example, a terminal ID 282 identifying the information processing terminal 100 used by the user, and a contract data amount 283. In addition, a low-speed bandwidth 284 and an additional purchase price 285 may be further managed. The low-speed bandwidth 284 is the transmission speed of a low-speed communication line to which the communication line is shifted when the data usage exceeds the contract data amount 283 within the contract unit period. The additional purchase price 285 is a price per unit data amount to purchase an additional data amount of high-speed communication line, that is, an additional purchase unit price. Furthermore, in the case where the carrier offers a communication service in which the price per unit data amount varies depending on the data amount to be additionally purchased, a plurality of additional purchase prices 285 can be managed.

The communication data amount management unit 220 monitors usages (amount of transmitted data) of the high-speed communication line and updates the remaining data amount for each using. In the case that the additional purchase price 285 is not managed in the communication line contract information 281, the communication data amount management unit 220 inquires the communication path charging management device 310 of the carrier-side device 300 about the price to obtain the information about the price.

The display control unit 230 is configured to control the display processing on the display 131 of the information processing terminal 100. In the present embodiment, the display control unit 230 displays information such as the content, a menu, an input acceptance screen for a content purchase request, and an instruction acceptance screen for additional purchase, and accepts an instruction as necessary.

[Communication Data Amount Management Processing]

Figure 5:
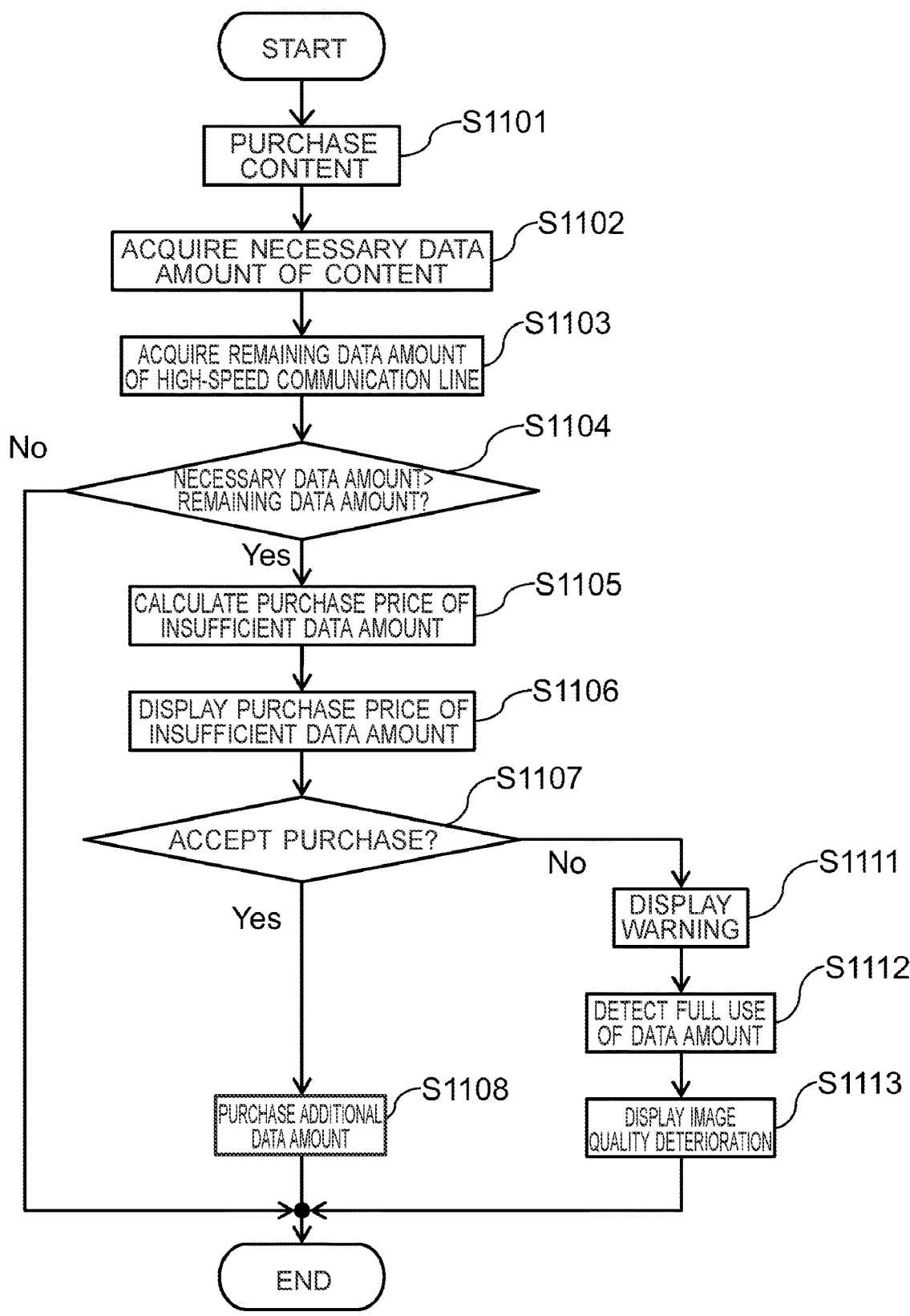
FIG. 5 illustrates a flowchart of communication data amount management processing according to the first embodiment.

Next, a flow of communication data amount management processing by the information processing terminal 100 of the present embodiment will be described. FIG. 5 illustrates a processing flow of the communication data amount management processing according to the present embodiment.

This processing is triggered by reception of an instruction to purchase the content from the user.

The content management unit 210 purchases the content (step S1101). Here, the content management unit 210 transmits a purchase request to the content server 400, and receives the content attribute information 271 in response thereto.

Figure 6A:
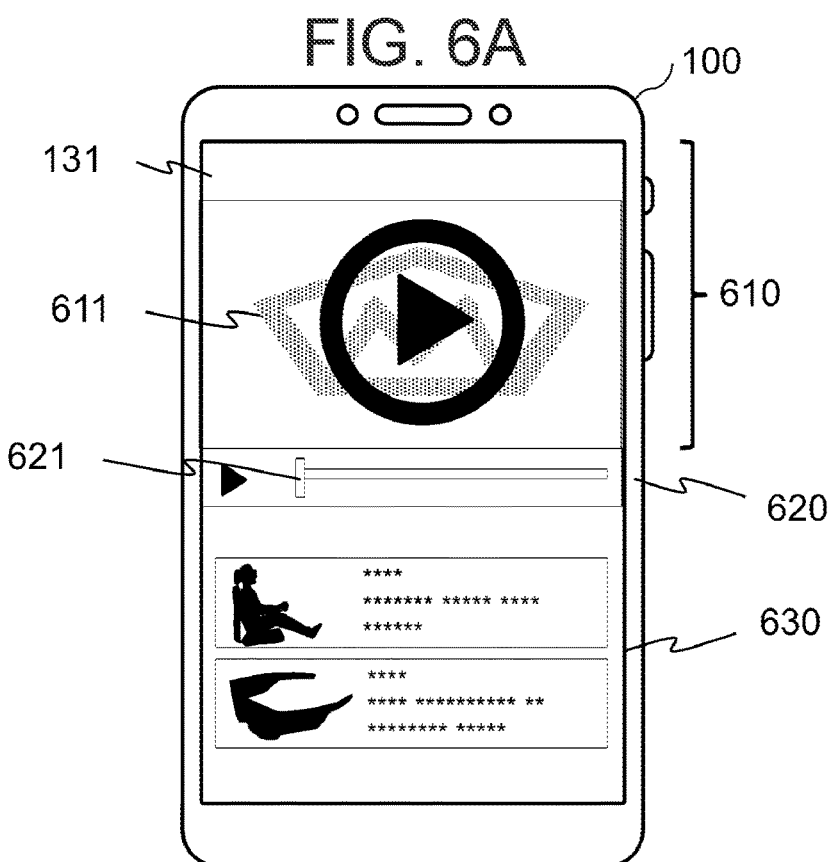
FIG. 6(a) and FIG. 6(b) are diagrams for explaining display examples on a display according to the first embodiment.
Figure 6B:
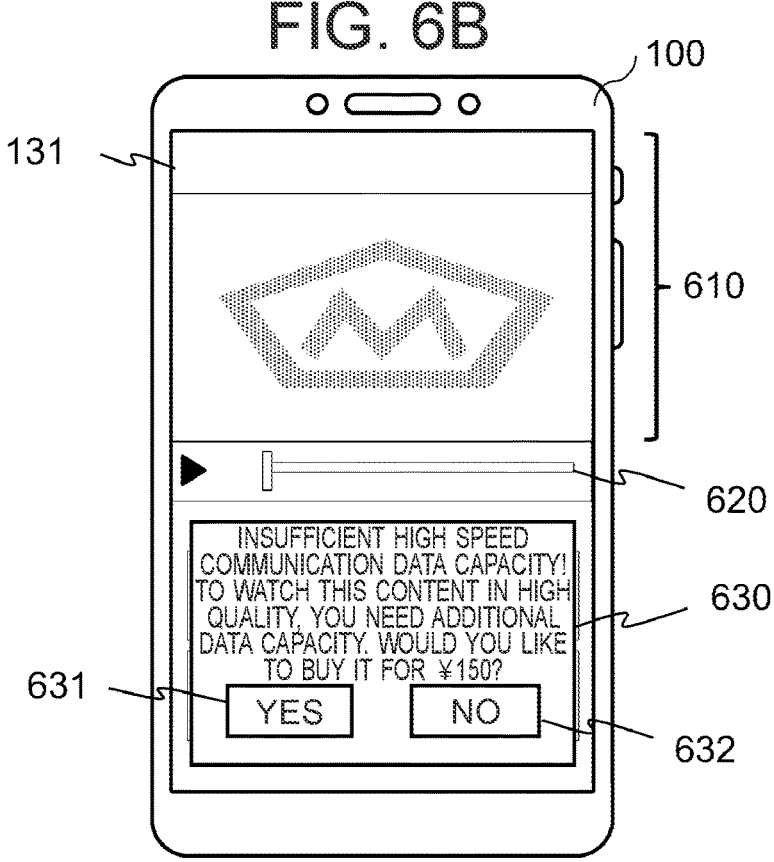

FIG. 6(*a*) illustrates a display example displayed at this time on the display 131 by the display control unit 230. A display area of the display 131 includes a content display area 610, a play amount display area 620, and other items display area 630.

At this point, the content display area 610 displays at least a start instruction display 611 for accepting an instruction to start displaying from the user, and the play amount display area 620 displays a play position slide bar 621.

The content management unit 210 acquires the total data amount 273 of the content stored in the content attribute information 271 (step S1102). Then, the content management unit 210 notifies the communication data amount management unit 220 of the total data amount 273 as the necessary data amount.

Next, upon receiving the information about the necessary data amount of the content from the content management unit 210, the communication data amount management unit 220 acquires the remaining data amount of the high-speed communication line at present (step S1103).

Then, the communication data amount management unit 220 compares the necessary data amount with the remaining data amount to determine whether the necessary data amount is more than the remaining data amount (step S1104).

When the necessary data amount is equal to or less than the remaining data amount (step S1104; No), the communication data amount management processing is ended as it is.

On the other hand, when the necessary data amount is more than the remaining data amount (step S1104; Yes), the communication data amount management unit 220 calculates a purchase price of the insufficient data amount (step S1105). Here, firstly, the communication data amount management unit 220 calculates the insufficient data amount. The insufficient data amount is a difference between the necessary data amount and the remaining data amount. Then, the communication data amount management unit 220 inquires the communication path charging management device 310 of the carrier-side device 300 about the purchase amount of the insufficient data amount. Upon receiving the information about the purchase price in response to the inquiry, the communication data amount management unit 220 notifies the display control unit 230 of the information.

In the case where the unit of additional purchase of data amount available in the high-speed communication line is defined in advance, a purchase price of the data amount of the smallest unit exceeding the insufficient data amount is calculated. For example, when the insufficient data amount is 180 MB and the minimum purchase unit is 100 MB, the data amount to be purchased is 200 MB.

The display control unit 230 displays the purchase price of the insufficient data amount (step S1106). The display control unit 230 creates and displays a message using the information about the purchase price and data stored in the memory and storage 110 in advance.

FIG. 6(*b*) illustrates a display example displayed at this time on the display 131. As illustrated in FIG. 6(*b*), the display control unit 230 displays the created message in the other items display area 630. The message includes the information indicating the purchase price. At this point, the display control unit 230 also displays buttons for accepting an intention of whether to purchase, and waits for selection by the user (step S1107). FIG. 6(*b*) illustrates an example of displaying a "Yes" button 631 as a button for accepting an intention to purchase, and a "No" button 632 as a button for accepting an intention not to purchase. The message may further include a play time corresponding to the insufficient data amount. Note that the message does not necessarily have to include the purchase price. Even if the purchase price of the insufficient data amount is calculated, the information about the price does not have to be displayed.

Upon receiving the intention to purchase from the user (step S1107; Yes), the communication data amount management unit 220 executes the additional purchase processing (step S1108), and then the communication data amount management processing is ended.

In the additional purchase processing, the communication data amount management unit 220 transmits an additional purchase request to the carrier-side device 300. In the carrier side device 300, regarding the communication line used by the information processing terminal 100 which has transmitted the request, the communication path data amount management device 320 enables use of the high-speed communication line corresponding to newly purchased data amount, and then the communication path control device 330 controls the communication path. The communication path charging management device 310 additionally records the charging for the newly purchased data amount in the registered user of the communication line.

On the other hand, when receiving the intention not to purchase from the user (step S1107; No), the display control unit 230 displays a warning (step S1111). The warning display is provided for notifying the user that the remaining data amount of the high-speed communication line is so small that the user has to view the content across the low-speed communication line after usage up to the limit amount. For example, data of messages and the like used for the warning display is stored in the memory and storage 110 in advance.

Thereafter, the communication data amount management unit 220 continues to monitor the usage of the high-speed communication line, and notifies the display control unit 230 when detecting full use of amount of data (step S1112). For example, the communication data amount management unit 220 outputs a full use signal indicating that the amount of data is fully used to the display control unit 230.

Upon receiving the full use signal, the display control unit 230 displays an image quality deterioration message (step S1113), and then the communication data amount management processing is ended. The image quality deterioration display is provided for notifying that the content is to be displayed in low image quality thereafter. Data, messages, and the like necessary for this display are stored in the memory and storage 110 in advance.

As described above, the information processing terminal 100 according to the present embodiment is the information processing terminal 100 allowing a user to view the content stored in the content server 400, which is an external server via contracted communication lines, and comprises a communication data amount management unit 220 configured to manage an amount of data communicated via a high-speed communication line of the communication lines; and a display control unit 230 configured to execute display control. In a case where there is a possibility that an amount of data necessary for viewing of the content is about to exceed a remaining data amount which is an amount of data remaining within a contracted amount of data, the communication data amount management unit calculates, as a purchase price, a price to additionally purchase a predetermined amount of data of the high-speed communication line, which corresponds to an insufficient amount of data, based on a predetermined condition, and the display control unit 230 displays the calculated purchase price.

Furthermore, the information processing terminal 100 according to the present embodiment further comprises the content management unit 210 configured to acquire and play content. Upon requesting the content to the content server 400 which is an external server, the content management unit 210 acquires, prior to start of distribution of the content, the content attribute information 271 including the data of data amount indicating the total amount of data of the content, and extracts the total data amount 273 therefrom as the necessary data amount. When the remaining data amount of the high-speed communication line is less than the necessary data amount, the communication data amount management unit 220 calculates, as an insufficient data amount, a difference between the necessary data amount and the remaining data amount as the insufficient data amount, and calculates, as a purchase price, a price to purchase the calculated insufficient data amount.

As described above, the information processing terminal 100 of the present embodiment is configured to determine whether the contracted communication line is about to be insufficient based on the necessary data amount of the content, and promote additional purchase in the case where it would be insufficient. Furthermore, the information processing terminal 100 of the present embodiment allows the user to additionally purchase the insufficient data amount by means of the information processing terminal 100 that the user is operating to view the content before start of play of the content. This can minimize the additional purchase of the data amount of the high-speed communication line depending on the content to be viewed. In addition, the information processing terminal 100 of the present embodiment does not force the user to start an application for purchasing the insufficient data amount. Therefore, the information processing terminal 100 of the present embodiment allows the user to continuously view the high-quality content for a desired period of time without placing an unnecessary burden on the user.

<First Modification>

In the embodiment described above, the information processing terminal 100 sends an inquiry to the carrier-side device 300 to acquire the purchase price of the insufficient data amount of the high-speed communication line. However, the present invention is not limited to this approach.

For example, in the case where the communication line contract information 281 includes the additional purchase price 285, the communication data amount management unit 220 uses this additional purchase price 285 to calculate a purchase price of the insufficient data amount.

This enables execution of the processing without via the communication line to send an inquiry.

<Second Modification>

In the embodiment described above, the communication data amount management unit 220 monitors the usage of the high-speed communication line and compares the usage with the limit amount of the high-speed communication line held in advance so as to calculate the remaining data amount. However, an approach for acquiring the remaining data amount is not limited thereto.

For example, the information processing terminal 100 may be configured to send an inquiry to the carrier-side device 300 to acquire the remaining data amount. That is, the remaining data amount, at that point, of the contracted communication line is acquired from the communication path data amount management device 320. According to this approach, the remaining data amount can be acquired with higher accuracy. For example, this approach is used in the case where the user subscribes to a communication service in which a plurality of users, such as family members, shares the contracted data amount.

<Third Modification>

Furthermore, the information processing terminal 100 may be configured to, when determining that the contracted data amount of the high-speed communication line is insufficient, change the processing depending on the necessary transmission speed of the content to be viewed. That is, when the necessary transmission speed is less than the transmission speed of the low-speed communication line, the information processing terminal 100 may not need to recommend new purchase of the data amount of the high-speed communication line.

Figure 7:
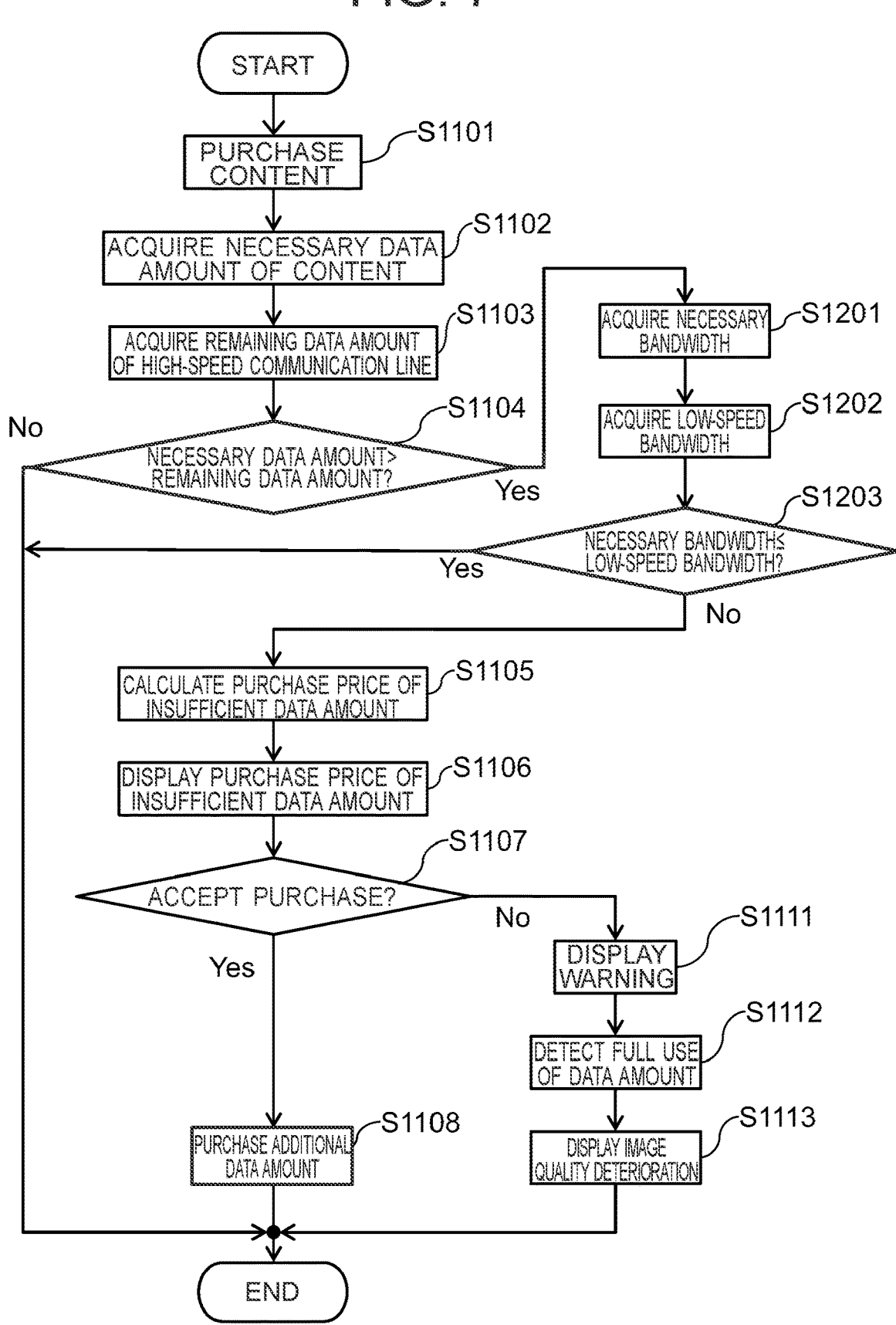
FIG. 7 illustrates a flowchart of communication data amount management processing according to a modification of the first embodiment.

FIG. 7 illustrates a flow of communication data amount management processing in this case. The flow of the processing according to the present modification is basically the same as the flow of the communication data amount management processing according to the first embodiment. In the following, the flow of the processing will be described with focus on the steps different from those of the first embodiment.

In this case, when it is determined in step S1104 that the necessary data amount is more than the remaining data amount (step S1104; Yes), prior to calculation of a purchase price of the insufficient data amount (step S1105), the necessary transmission speed of the content to be viewed is compared with the transmission speed of the low-speed communication line.

Specifically, the content management unit 210 refers to the content attribute information 271 and acquires a necessary bandwidth of the content (step S1201).

Next, the communication data amount management unit 220 acquires the transmission speed of the low-speed communication line (low-speed bandwidth) (step S1202). The communication data amount management unit 220 acquires the low-speed bandwidth from the communication line contract information 281 in the case where it is managed therein. If the low-speed bandwidth is not managed therein, the communication data amount management unit 220 inquires the carrier-side device 300 to acquire it.

Then, the communication data amount management unit 220 compares the necessary transmission speed of the content with the transmission speed of the low-speed communication line to determine whether the necessary transmission speed is more than the transmission speed of the low-speed communication line (step S1203).

When the necessary bandwidth is equal to or less than the low-speed bandwidth (step S1203; Yes), the communication data amount management processing is ended as it is.

On the other hand, when the necessary bandwidth is more than the low-speed bandwidth (step S1203; No), the processing proceeds to step S1105. Subsequent steps are the same as those of the first embodiment.

As described above, according to the present modification, even if the data amount of the high-speed communication line is insufficient, when the necessary bandwidth is equal to or less than the bandwidth of the contracted low-speed communication line, the communication data amount management unit 220 does not calculate a purchase price of the insufficient data amount. This enables the user to avoid unnecessary additional purchase of the data amount of the high-speed communication line to play the content which can be sufficiently played across the low-speed communication line. That is, it is possible to propose additional purchase of the data amount of the high-speed communication line to the user only when necessary, whereby a more user-friendly data traffic management technique can be provided.

Second Embodiment

Next, a second embodiment of the present invention will be described. In the present embodiment, the information processing terminal 100 is configured to consider the reduction in the data amount of the communication line while the user is viewing the content, which is caused by the usage by other application programs via the communication line.

The configuration of the communication system 900 according to the present embodiment is the same as that of the first embodiment. The configuration of the carrier-side device 300 and that of the content server 400 are also the same as those of the first embodiment. The hardware configuration and functional blocks of the information processing terminal 100 are basically the same as those of the first embodiment. However, a part of the functions of the content management unit 210 and communication data amount management unit 220 are different from those of the first embodiment.

In the following, the present embodiment will be described with focus on the functions different from those of the first embodiment.

The communication data amount management unit 220 of the present embodiment is configured to, after the remaining data amount of the contracted high-speed communication line becomes equal to or less than a predetermined value, determine whether the entire content can be viewed in the same manner as the first embodiment.

Specifically, the communication data amount management unit 220 of the present embodiment acquires the remaining data amount of the contracted high-speed communication line at predetermined time intervals. Then, the communication data amount management unit 220 compares, for each acquisition, the remaining data amount with a threshold value of a predetermined remaining data amount (remaining amount threshold value Trc). When the remaining data amount becomes equal to or less than the remaining amount threshold value Trc, the communication data amount management unit 220 compares the remaining data amount with the data amount of a part of the content which has not been played yet (unplayed data amount). When the remaining data amount becomes equal to or less than the remaining data amount threshold Trc, the communication data amount management unit 220 outputs an unplayed data amount checking signal to the content management unit 210 so as to cause the content management unit 210 to check the unplayed data amount.

Upon receiving the unplayed data amount checking signal from the communication data amount management unit 220, the content management unit 210 acquires the unplayed data amount at this point as the necessary data amount, and notifies the communication data amount management unit 220 of the unplayed data amount.

Specifically, the content management unit 210 monitors the play of the content, and acquires the played data amount at predetermined intervals. Then, for each acquisition, the content management unit 210 subtracts the played data amount from the total data amount 273 of the initially acquired content attribute information 271 to calculate the unplayed data amount. Note that the predetermined intervals are not limited to time, but may be the received data amount.

Hereinafter, a flow of the communication data amount management processing by the information processing terminal 100 according to the present embodiment will be described. FIG. 8 illustrates a processing flow of the communication data amount management processing according to the present embodiment. This processing is also triggered by reception of an instruction to purchase the content from the user.

The content management unit 210 purchases the content (step S2101). In the same manner as the first embodiment, the content management unit 210 transmits a purchase request to the content server 400, and receives the content attribute information 271 in response thereto. In the present embodiment, the information processing terminal 100 starts playing the content. Note that the content attribute information 271 may be transmitted at the same time when the content is transmitted, or may be transmitted while the content is being transmitted.

Figures 9A, 9B:
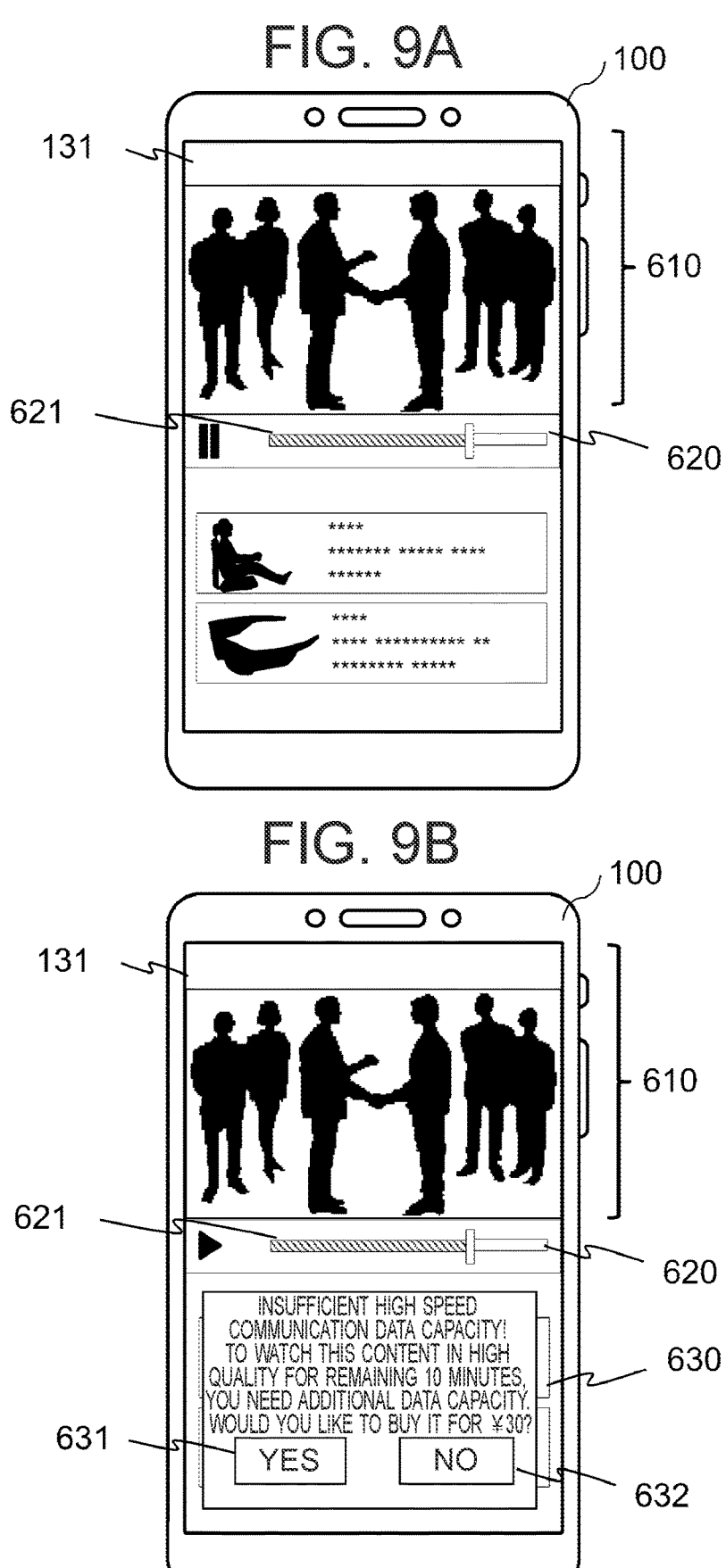
FIG. 9(a) and FIG. 9(b) are diagrams for explaining display examples on the display according to the second embodiment.

FIG. 9(a) illustrates a display example displayed at this time on the display 131 by the display control unit 230. In the present embodiment, play of the content is started at this point, and thus the content is being displayed in the content display area 610.

The communication data amount management unit 220 acquires the remaining data amount of the high-speed communication line at predetermined time intervals (step S2102). Then, the communication data amount management unit 220 compares the acquired remaining data amount with the predetermined remaining amount threshold value Trc to determine whether the remaining data amount is equal to or less than the remaining amount threshold value Trc (step S2103).

When the remaining data amount is more than the remaining amount threshold value Trc (step S2103; No), the processing returns to step S2102 and then repeated.

On the other hand, when the remaining data amount is equal to or less than the remaining data amount threshold value Trc (step S2103; Yes), the communication data amount management unit 220 outputs, to the content management unit 210, an unplayed data amount acquiring signal for causing the content management unit 210 to acquire the unplayed data amount of the content. Upon receiving the signal, the content management unit 210 acquires the unplayed data amount at this point as the necessary data amount (step S2104).

The subsequent steps are the same as steps S1104 to S1108 and steps S1111 to S1113 of the first embodiment.

However, in the present embodiment, in step S1104, when the necessary data amount is equal to or less than the remaining data amount (step S1104; No), the processing returns to step S2102. As described above, in the present embodiment, the operations of other application programs using the communication line while the user is viewing the content are also taken into consideration. The remaining data varies until the next checking interval as other application programs use the data amount of the high-speed communication line. The necessary data amount also varies as the play of the content continues. In view of these, the latest values thereof are used for comparison at the next checking interval.

Furthermore, even after the additional purchase (step S1108), unless the user finishes viewing the content (step S2105), the processing returns to step S2102 and then is repeated. Even after the additional data amount is purchased, other application programs may use the data amount of the high-speed communication line. This may lead to a possibility that the data amount more than the insufficient data amount calculated in step S1105 becomes necessary.

In the present embodiment, the content management unit 210 may be configured to pause the play of the content while the display control unit 230 is displaying the purchase price of the insufficient data amount in step S1106. The content management unit 210 may automatically restart the play of the content upon accepting the purchase, or after accepting an instruction not to purchase and then displaying the warning.

FIG. 9(b) illustrates a display example displayed on the display 131 in step S1106. In the same manner as the first embodiment, the display control unit 230 displays the created message in the other items display area 630, and also display the buttons for accepting an intention of whether to purchase and waits for selection by the user.

However, in the present embodiment, the displayed message is different from that of the first embodiment. In the present embodiment, the message includes not only the information indicating the purchase price, but also the information of the play time corresponding to the unplayed data amount.

Furthermore, in the present embodiment, since the play of the content has already been started, the content is being displayed in the content display area 610. In addition, the play position slide bar 621 is displayed in such a manner of allowing the user to grasp the play amount.

As described above, in the information processing terminal 100 of the present embodiment, the communication data amount management unit 220 acquires the remaining data amount of the contracted high-speed communication line at predetermined time intervals, and outputs the unplayed data amount acquiring signal for acquiring the unplayed data amount of the content to the content management unit 210 when the remaining data amount is equal to or less than the predetermined remaining amount threshold value Trc. Upon receiving the signal, the content management unit 210 calculates the unplayed data amount of the content being viewed as the necessary data amount. When the latest remaining data amount of the high-speed communication line is less than the necessary data amount, the communication data amount management unit 220 calculates the insufficient data amount of the high-speed communication line to calculate a price to purchase the insufficient data amount as a purchase price.

As described above, in the same manner as the first embodiment, the information processing terminal 100 of the present embodiment is configured to determine whether the contracted communication line is insufficient depending on the unplayed data amount of the content, and promote additional purchase when the contracted communication line is insufficient. At this time, the information processing terminal 100 of the present embodiment also considers the usage of the communication line by other application programs.

Therefore, in addition to the advantageous effects of the first embodiment, in the present embodiment, the insufficient data amount of the high-speed communication line can be calculated with higher accuracy, and thus it is possible to further suppress a burden on the user while allowing the user to continue to view the high-quality content.

The present embodiment may be combined with the first to third modifications.

Third Embodiment

Next, a third embodiment of the present invention will be described. The first embodiment is provided for viewing of content whose total data amount is known. On the other hand, the present embodiment is provided for viewing of content whose total data amount is unknown. The content whose total data amount is unknown is, for example, sports broadcasting or the like whose end time is not fixed in advance.

The configuration of the communication system 900 according to the present embodiment is the same as that of the first embodiment. The configuration of the carrier-side device 300 and that of the content server 400 are also the same as those of the first embodiment. The hardware configuration and functional blocks of the information processing terminal 100 are basically the same as those of the first embodiment. However, a part of the functions of the content management unit 210 and communication data amount management unit 220 are different from those of the first embodiment.

In the present embodiment, in the same manner as the second embodiment, the communication data amount management unit 220 checks the remaining data amount of the high-speed communication line at predetermined time intervals. In the present embodiment, however, when the remaining data amount becomes equal to or less than the remaining amount threshold value Trc, the communication data amount management unit 220 issues an instruction to the content management unit 210 to cause the content management unit 210 to calculate an average transmission rate of the content.

Then, the communication data amount management unit 220 according to the present embodiment uses the average transmission rate of the content to calculate a subsequent purchase price, and presents the calculated purchase price to the user. At this time, in the present embodiment, the communication data amount management unit 220 may use a plurality of different conditions to calculate a plurality of purchase prices. The plurality of conditions includes, for example, subsequent different viewing times.

The content management unit 210 calculates the average transmission rate of the content up to that point in time. For example, the content management unit 210 obtains the average transmission rate of the content by dividing the viewed data amount up to that point in time by a viewing period. Then, the content management unit 210 outputs the calculated average transmission rate to the communication data amount management unit 220.

Figure 10:
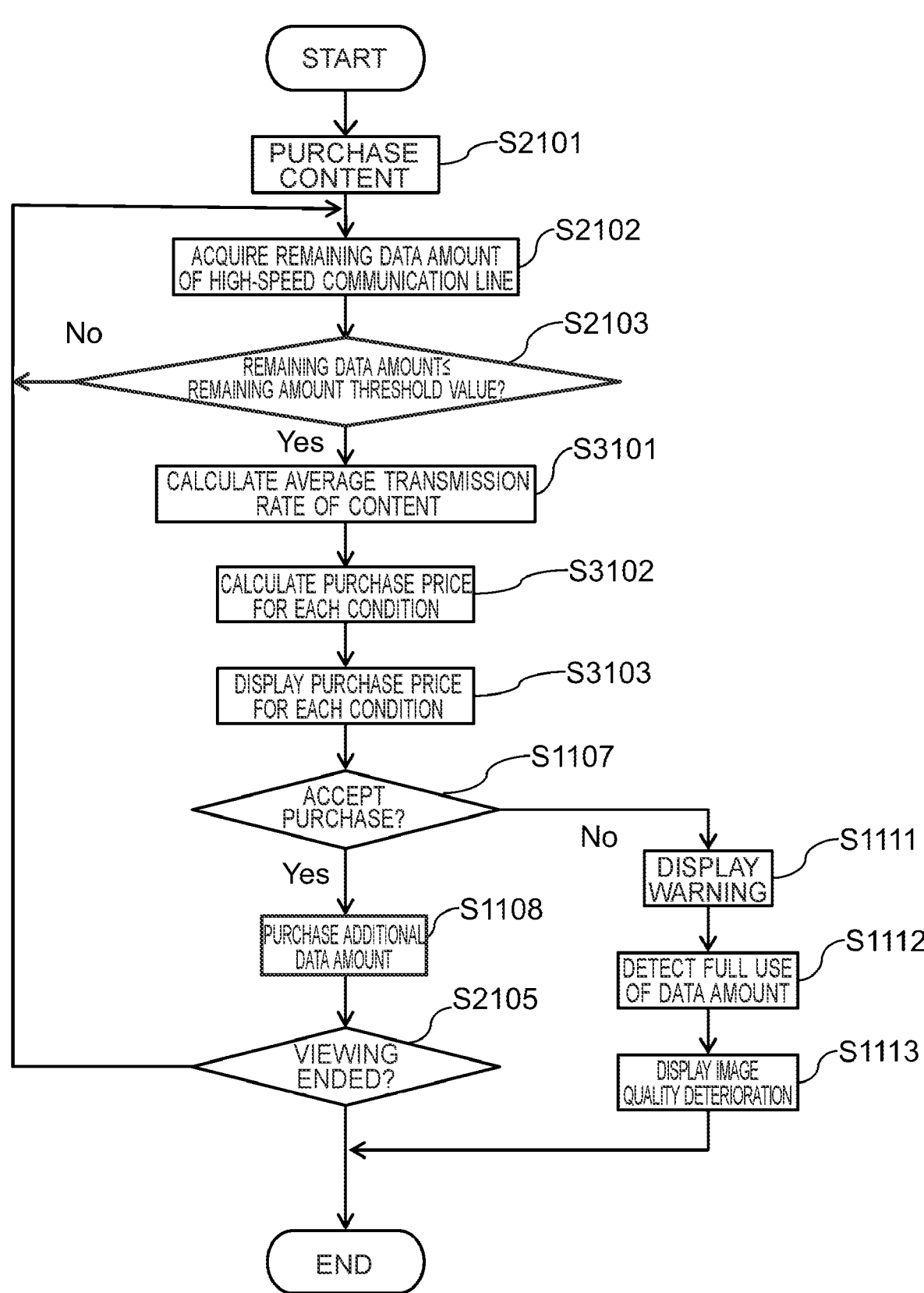
FIG. 10 illustrates a flowchart of communication data amount management processing according to a third embodiment.

Hereinafter, a flow of the communication data amount management processing by the information processing terminal 100 according to the present embodiment will be described. FIG. 10 illustrates a processing flow of the communication data amount management processing according to the present embodiment. This processing is also triggered by reception of an instruction to purchase the content by the user.

Hereinafter, the flow of the communication data amount management processing according to the present embodiment will be described with focus on the steps different from those of the second embodiment.

The content management unit 210 purchases the content (step S2101).

The communication data amount management unit 220 acquires the remaining data amount of the high-speed communication line at predetermined time intervals (step S2102). Then, the communication data amount management unit 220 compares the acquired remaining data amount with the predetermined remaining amount threshold value Trc to determine whether the remaining data amount is equal to or less than the remaining amount threshold value Trc (step S2103).

When the remaining data amount is more than the remaining amount threshold value Trc (step S2103; No), the processing returns to step S2102 and then is repeated.

On the other hand, when the remaining data amount is equal to or less than the remaining amount threshold value Trc (step S2103; Yes), the communication data amount management unit 220 provides the content management unit 210 with a calculation instruction notification to cause the content management unit 210 to calculate the average transmission rate of the content. Upon receiving the calculation instruction notification, the content management unit 210 calculates the average of the transmission rate up to that point in time to obtain an average transmission rate AA of the content (step S3101), and outputs the average transmission rate AA to the communication data amount management unit 220.

The communication data amount management unit 220 uses the average transmission rate AA to calculate a purchase price for each predetermined viewing condition (step S3102). In the present embodiment, the communication data amount management unit 220 calculates, for example, purchase prices of a plurality of viewing times, respectively. For example, assuming that the purchase unit price per unit time is BB, the purchase price in the case of viewing the content for T1 hours can be calculated by $AA \times T1 \times BB$.

The display control unit 230 displays the calculated purchase price (step S3103). The subsequent steps are the same as those of the second embodiment. Note that the additional purchase in step S1108 is based on the selection in step S1107.

Figure 11:
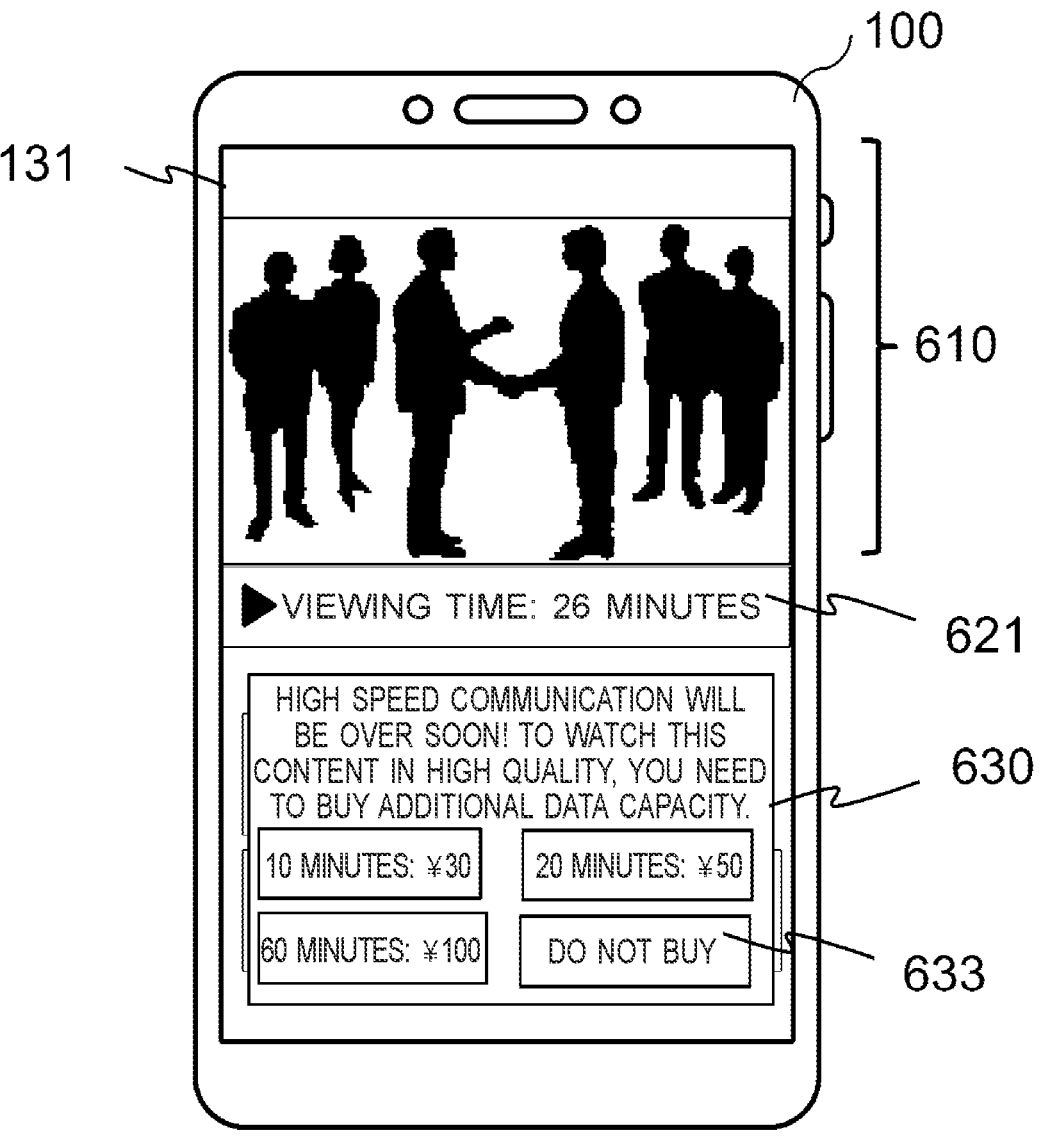
FIG. 11 is a diagram for explaining a display example on a display according to the third embodiment.

FIG. 11 illustrates a display example displayed on the display 131 in step S3103. The display control unit 230 displays basically in the same manner as the second embodiment. However, in the present embodiment, a message and intention acceptance buttons displayed in the other items display area 630 are different therefrom. In addition, since the total data amount of the content being viewed is unknown, the display control unit 230 displays, in the play amount display area 620, information allowing the user to grasp the viewing amount up to that point in time, for example, the viewing time.

FIG. 11 illustrates an example of calculating the purchase prices for three types of viewing conditions (viewing time), namely, 10 minutes, 20 minutes, and 60 minutes, respectively. Each of the conditions and an intention not to purchase are displayed in a manner allowing user's selection. In buttons 633 for selecting each of the conditions, the conditions (viewing time) and the corresponding purchase prices are displayed.

In the same manner as the second embodiment, in the present embodiment as well, the content management unit 210 may pause the play of the content while the display control unit 230 is displaying the purchase price for each condition in step S3103. The content management unit 210 may automatically restart the play of the content upon accepting the purchase, or after accepting an instruction not to purchase and then displaying the warning.

As described above, in the information processing terminal 100 of the present embodiment, the communication data amount management unit 220 acquires the remaining data amount of the high-speed communication line at predetermined time intervals, and outputs the calculation instruction notification to the content management unit 210 when the remaining data amount is equal to or less than the predetermined remaining amount threshold. Upon receiving the notification, the content management unit 210 calculates the average transmission rate of the content being viewed.

Thereafter, the communication data amount management unit 220 uses the average transmission rate to calculate, as the purchase prices, prices to purchase the necessary data amount of the high-speed communication line, for predetermined conditions, respectively, and the display control unit displays the purchase prices in association with the conditions, respectively.

As described above, the information processing terminal 100 according to the present embodiment is configured to promote additional purchase when the contracted communication line is likely to be insufficient even while the user is viewing content whose total data amount is unknown. At this time, the user can select an additional purchase price from among the prices corresponding to a plurality of conditions, for example, viewing times. This can minimize the additional purchase of the data amount of the high-speed communication line depending on the content to be viewed in the same manner as the first embodiment and the second embodiment. In addition, the information processing terminal 100 of the present embodiment does not force the user to start an application for purchasing the insufficient data amount. Therefore, the information processing terminal 100 of the present embodiment allows the user to continuously view the high-quality content for a desired period of time without placing an unnecessary burden on the user.

The present embodiment may be combined with the first to third modifications.

<Fourth Modification>

In the embodiments described above, the information processing terminal 100 asks the user whether to purchase the additional data amount, and when accepting an intention not to purchase, executes the processes in steps S1111 to S1113 and then displays the warning or the like. However, these processes may not be executed. The information processing terminal 100 may be configured to provide only the warning display or the image quality degradation display.

The present invention is not limited to the embodiments and modifications described above, but includes other various modifications. For example, the embodiments and modifications described above have been explained in detail in order to clarify the present invention, but are not necessarily limited to those having all the features as described. In addition, a part of the configuration of the present embodiments and modifications can be replaced with that of other embodiments and modifications, and the features of other embodiments and modifications can be added to the configuration of the present embodiments and modifications. Furthermore, it is possible to add, delete, or replace other configurations with respect to a part of the configuration of the present embodiments and modifications.

Some or all the configurations, functions, processing units, and processing means described above may be implemented by hardware, for example, by designing them with an integrated circuitry. In addition, the configurations and functions described above may be implemented by software by interpreting and executing programs in which the processor implements the respective functions. Information such as programs, tables, and files for implementing various functions can be placed in recording devices such as a memory, hard disk, and solid-state drive (SSD), or recording media such as an IC card, SD card, and DVD.

Furthermore, the control lines and information lines which are considered to be necessary for the purpose of explanation are indicated herein, but not all the control lines and information lines of actual products are necessarily indicated. It may be considered that almost all the configurations are actually connected to each other.

REFERENCE SIGNS LIST

100: information processing terminal, 100S: smartphone, 101: main processor, 102: system bus, 103: RAM, 104: storage, 109S: case, 110: memory and storage, 120: operation acceptance device, 121: operation key, 121P: power switch, 122: touch sensor, 123: touch panel, 124: fingerprint sensor, 125: LED, 127: touch screen, 130: image processing device, 131: display, 132: image signal processing unit, 133: first image acquisition unit, 134: second image acquisition unit, 140: audio processing device, 141: audio output unit, 141M: audio output unit, 141S: audio output unit, 142: audio signal processing unit, 143: audio input unit, 150: sensor, 151: reception unit, 152: gyro sensor, 153: geomagnetic sensor, 154: acceleration sensor, 155: range sensor, 160: communication device, 161: LAN communication unit, 162: telephone network communication unit, 163: BT communication unit, 170: extended interface unit, 170U: USB terminal, 180: timer, 210: content management unit, 220: communication data amount management unit, 230: display control unit, 270: content attribute information database, 271: content attribute information, 272: content ID, 273: total data amount, 274: necessary bandwidth, 275: title, 276: type, 280: communication service contract database, 281: communication line contract information, 282: terminal ID, 283: contract data amount, 284: low-speed bandwidth, 285: additional purchase price, 300: carrier-side device, 310: communication path charging management device, 320: communication path data amount management device, 330: communication path control device, 340: contract information management device, 400: content server, 410: content library, 420: content charging management device, 430: content transmission management device, 500: network, 510: base station, 610: content display area, 611: start instruction display, 620: play amount display area, 621: play position slide bar, 630: other items display area, 631: "Yes" button, 632: "No" button, 633: selection button, 900: communication system, Trc: remaining amount threshold value

The invention claimed is:

1. An information processing terminal allowing a user to view a content stored in an external server via contracted communication lines, the information processing terminal comprising:

a processor, wherein the processor is configured to:

manage an amount of data communicated via a high-speed communication line of the communication lines, execute display control, acquire the content and play the content, in a case where there is a possibility that an amount of data necessary for viewing of the content is about to exceed a remaining data amount which is an amount of data remaining within a contracted amount of data, acquire necessary information which is information necessary for additional purchase of a predetermined amount of data of the high-speed communication line based on a predetermined condition, display the necessary information, and acquire the remaining data amount at predetermined intervals, in a case where the remaining data amount is equal to or less than a predetermined remaining amount threshold value, output a calculation instruction notification, calculate an average transmission rate of the content being viewed, use the average transmission rate to acquire necessary information which is information necessary for additional purchase of a predetermined amount of data of the high-speed communication line for each of predetermined conditions, and display the necessary information in association with the predetermined conditions, respectively.

2. The information processing terminal according to claim 1, acquire the content and play the content, wherein the processor is configured to:

upon requesting the content to the external server, acquire a total amount of data of the content as a necessary data amount prior to start of distribution of the content, and in a case where the remaining data amount is less than the necessary data amount, calculate, as an insufficient data amount, an amount of data which is a difference between the necessary data amount and the remaining data amount, and use, as the necessary information, information necessary for additional purchase of the insufficient data amount.

3. The information processing terminal according to claim 1, wherein the processor is configured to:

acquire the remaining data amount at predetermined intervals, in a case where the remaining data amount is equal to or less than a predetermined remaining amount threshold value, output an unplayed data amount acquiring signal for acquiring an amount of data of an unplayed portion of the content, upon receiving the unplayed data amount acquiring signal, calculate, as a necessary data amount, the amount of data of the unplayed portion of the content, in a case where the remaining data amount acquired the most recently is less than the necessary data amount, calculate, as an insufficient data amount, an amount of data which is a difference between the necessary data amount and the remaining data amount, and uses, as the necessary information, information necessary for additional purchase of the insufficient data amount.

4. The information processing terminal according to claim 1, wherein the predetermined conditions are viewing times, and the processor is configured to:

use the average transmission rate to calculate an amount of data of the high-speed communication line necessary for viewing for each of the viewing times, and acquire, as the necessary information, information necessary for additional purchase of the amount of data as calculated.

5. The information processing terminal according to claim 1, wherein the information necessary for additional purchase is a price, and the necessary information is a purchase price.

6. The information processing terminal according to claim 5, wherein the processor is configured to:

send an inquiry to a device of a carrier that manages the communication lines about an additional purchase unit price of an amount of data of the high-speed communication line, and calculate the purchase price based on a response to the inquiry.

7. The information processing terminal according to claim 5, wherein an additional purchase unit price of the amount of data of the high-speed communication line is stored in advance as a communication service contract database, and the processor is configured to refer to the communication service contract database to calculate the purchase price.

8. The information processing terminal according to claim 1, wherein the processor is configured to:

display, together with the necessary information, an acceptance button for accepting an intention to purchase, and upon accepting the intention to purchase via the acceptance button, transmit an additional purchase request to a carrier that manages the communication lines.

9. The information processing terminal according to claim 1, wherein the processor is configured to:

display, together with the necessary information, an acceptance button for accepting an intention to purchase, and upon accepting the intention not to purchase via the acceptance button display a warning.

10. The information processing terminal according to claim 9, wherein after the warning is displayed, the processor is configured to:

monitor a usage of an amount of data of the high-speed communication line, in a case where the contracted amount of data is fully used, output a full use signal indicating that the contracted amount of data is fully used, and upon receiving the full use signal, output a message indicating that the contracted amount of data is fully used.

11. The information processing terminal according to claim 1, wherein the processor is configured to:

upon requesting the content to the external server, acquire a necessary bandwidth indicating a bandwidth necessary for play of the content prior to start of distribution of the content, and even there is a possibility that the amount of data necessary for viewing of the content is about to exceed the remaining data amount, in a case where the necessary bandwidth is equal to or less than a bandwidth of a low-speed communication line used after the contracted amount of data is fully used, not acquire the necessary information.

12. The information processing terminal according to claim 1, wherein the processor is configured to:

stop play of the content while displaying the necessary information.

* * * * *